(12) United States Patent
Lee et al.

(10) Patent No.: US 11,467,688 B2
(45) Date of Patent: Oct. 11, 2022

(54) DISPLAY DEVICE INCLUDING TOUCH PANEL AND METHOD OF DRIVING DISPLAY DEVICE INCLUDING TOUCH PANEL

(71) Applicant: Samsung Display Co., Ltd., Yongin-Si (KR)

(72) Inventors: Junseong Lee, Gwangyang-si (KR); Bogeun Yuk, Hwaseong-si (KR); Min-Hong Kim, Hwaseong-si (KR); Taejoon Kim, Seongnam-si (KR); Eungkwan Lee, Hwaseong-si (KR); Hyun-Wook Cho, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/477,967

(22) Filed: Sep. 17, 2021

(65) Prior Publication Data
US 2022/0107703 A1    Apr. 7, 2022

(30) Foreign Application Priority Data
Oct. 7, 2020 (KR) .................. 10-2020-0129703

(51) Int. Cl.
*G06F 3/041* (2006.01)
*G06F 3/044* (2006.01)
(52) U.S. Cl.
CPC .......... *G06F 3/0416* (2013.01); *G06F 3/0446* (2019.05); *G06F 2203/04108* (2013.01)

(58) Field of Classification Search
CPC ............. G06F 3/0416; G06F 3/0446; G06F 2203/04108
See application file for complete search history.

(56) References Cited

U.S. PATENT DOCUMENTS

| | | | | |
|---|---|---|---|---|
| 5,880,411 | A * | 3/1999 | Gillespie | G06V 40/20 345/157 |
| 9,104,273 | B1 * | 8/2015 | Olson | G06F 3/0446 |
| 9,542,050 | B2 * | 1/2017 | Monney | G06F 3/0202 |
| 10,635,204 | B2 * | 4/2020 | Park | G06F 3/0488 |
| 11,225,145 | B1 * | 1/2022 | Bonnah | H04W 4/029 |
| 11,294,501 | B2 * | 4/2022 | Tang | G06F 3/044 |
| 2004/0013421 | A1 * | 1/2004 | Yoshida | G02B 7/34 396/123 |
| 2010/0328255 | A1 * | 12/2010 | Ishizaki | G06F 3/0412 345/174 |

(Continued)

FOREIGN PATENT DOCUMENTS

KR    1020190006123 A    1/2019

*Primary Examiner* — Amy Onyekaba
(74) *Attorney, Agent, or Firm* — Cantor Colburn LLP

(57) ABSTRACT

A display device includes a display panel including pixels, a touch panel including electrodes, a proximity sensor which is adjacent to the touch panel and detects proximity with respect to an object based on a capacitance variation, a display driver which drives the display panel and a touch controller which drives the touch panel and the proximity sensor. Here, the touch controller provides a negative voltage to the proximity sensor when the proximity sensor detects that the object approaches the proximity sensor such that a shortest distance from the object to the proximity sensor is equal to or less than a first reference distance.

20 Claims, 9 Drawing Sheets

(56) References Cited

U.S. PATENT DOCUMENTS

| | | | |
|---|---|---|---|
| 2010/0328257 A1* | 12/2010 | Noguchi | G02F 1/13338 |
| | | | 345/174 |
| 2011/0319128 A1* | 12/2011 | Miwa | H04M 1/72516 |
| | | | 455/550.1 |
| 2013/0076646 A1* | 3/2013 | Krah | G06F 3/0446 |
| | | | 345/173 |
| 2014/0357251 A1* | 12/2014 | Forutanpour | H04M 1/72448 |
| | | | 455/418 |
| 2015/0084902 A1* | 3/2015 | Atsumi | G06F 1/1688 |
| | | | 345/173 |
| 2015/0233765 A1* | 8/2015 | Micko | G01J 5/0025 |
| | | | 250/342 |
| 2016/0139725 A1* | 5/2016 | Noguchi | G06F 3/0412 |
| | | | 345/174 |
| 2016/0342264 A1* | 11/2016 | Takahashi | G06F 3/04166 |
| 2017/0090610 A1* | 3/2017 | Shepelev | G06F 3/04166 |
| 2018/0045820 A1* | 2/2018 | Fericean | G01S 7/35 |
| 2018/0253167 A1* | 9/2018 | Park | G06F 3/04883 |

\* cited by examiner

DISPLAY DEVICE INCLUDING TOUCH PANEL AND METHOD OF DRIVING DISPLAY DEVICE INCLUDING TOUCH PANEL

This application claims priority to Korean Patent Application No. 10-2020-0129703, filed on Oct. 7, 2020 and all the benefits accruing therefrom under 35 U.S.C. § 119, the content of which in its entirety is herein incorporated by reference.

BACKGROUND

1. Field

Embodiments of the invention relate to a display device. More particularly, embodiments of the invention relate to a display device including a touch panel, and a method of driving a display device including a touch panel.

2. Description of the Related Art

A touch panel is a device for recognizing an input action or event performed by a user. Typically, the touch panel may generate an electrical signal to detect presence and a location of a touch when the touch panel is touched by a conductive object such as a finger or a stylus pen. The touch panel may be mounted on a top surface of a display panel, such as an organic light emitting diode display panel or a liquid crystal display panel, or formed inside the display panel, and may be classified into a resistive film type, a capacitance type, an electromagnetic field type, an infrared ray type, a surface acoustic wave ("SAW") type, a near field imaging ("NFI") type, and the like. Among such various types of touch panels, a capacitance-type touch panel is being widely used due to a fast response speed and a thin thickness thereof.

SUMMARY

In order to reduce power consumption, a display device that supports a call mode during a call connection is recently developed. In such a call mode, in order for the display device to determine an on/off state of the display panel, it is desired to accurately measure a shortest distance to an object. Since a touch panel of a general display device has a limitation in measuring a capacitance variation, it is difficult to enter the call mode at a predetermined distance or more.

Embodiments of the invention provide a display device capable of driving a touch panel suitably for a call mode.

Embodiments of the invention also provide a method of driving a display device, capable of driving a touch panel suitably for a call mode.

In an embodiment of a display device according to the invention, the display device which detects an object includes a display panel including a plurality of pixels, a touch panel including a plurality of electrodes, a proximity sensor which is adjacent to the touch panel and detects proximity with respect to the object based on a capacitance variation, a display driver which drives the display panel and a touch controller which drives the touch panel and the proximity sensor. Here, the touch controller provides a negative voltage to the proximity sensor when the proximity sensor detects that the object approaches the proximity sensor such that a shortest distance from the object to the proximity sensor is equal to or less than a first reference distance.

In an embodiment, the display panel may stop displaying an image when the proximity sensor detects that the object approaches the proximity sensor such that the shortest distance from the object to the proximity sensor is equal to or less than a second reference distance, which is less than the first reference distance.

In an embodiment, the proximity sensor may be disposed on one side of wires of the touch panel while being spaced apart from the electrodes of the touch panel.

In an embodiment, the touch controller may provide a voltage of 0 volt (V) to the proximity sensor when the proximity sensor detects that the object moves away from the proximity sensor such that the shortest distance from the object to the proximity sensor is greater than or equal to the first reference distance.

In an embodiment, the touch controller may provide a voltage of about −3 V to the proximity sensor when the proximity sensor detects that the object approaches the proximity sensor such that the shortest distance from the object to the proximity sensor is equal to or less than the first reference distance.

In an embodiment, the touch controller may activate a call mode of the display device when the proximity sensor detects that the object approaches the proximity sensor such that the shortest distance from the object to the proximity sensor is equal to or less than the second reference distance.

In an embodiment, the proximity sensor may be disposed in a bezel area of the display panel in which the image is not displayed.

In an embodiment, the proximity sensor may include an input node and an output node, and the touch controller may determine a status of connection between an input node and an output node of the proximity sensor.

In an embodiment, the object may be a face of a user, and the proximity sensor may detect proximity with respect to the face of the user based on the capacitance variation.

In an embodiment, the touch controller may drive the touch panel in a mutual capacitance sensing scheme.

In an embodiment, the touch controller may drive the touch panel in a self-capacitance sensing scheme.

In an embodiment, the display driver may determine whether to display the image on the display panel according to an activation state of a call mode.

In an embodiment of a method of driving display device according to the invention, the method includes detecting proximity with respect to an object based on a capacitance variation, driving a proximity sensor according to a proximity state of the object, providing a negative voltage to the proximity sensor when detecting that the object approaches the proximity sensor such that a shortest distance from the object to the proximity sensor is equal to or less than a first reference distance and stopping displaying an image when detecting that the object approaches the proximity sensor such that the shortest distance from the object to the proximity sensor is equal to or less than a second reference distance, which is less than the first reference distance.

In an embodiment, the proximity sensor may be disposed on one side of wires of the touch panel while being spaced apart from the electrodes of the touch panel.

In an embodiment, the driving the proximity sensor may include providing a voltage of 0 V to the proximity sensor when the proximity sensor detects that the object moves away from the proximity sensor such that the shortest distance from the object to the proximity sensor is greater than or equal to the first reference distance.

In an embodiment, the negative voltage may include a voltage of about −3 V.

In an embodiment, the method may further include activating a call mode when the proximity sensor detects that the object approaches the proximity sensor such that the shortest distance from the object to the proximity sensor is equal to or less than the second reference distance or less.

In an embodiment, the object is a face of a user, and the proximity sensor may detect proximity with respect to the face of the user based on the capacitance variation.

In an embodiment, the method may further include driving the touch panel in a mutual capacitance sensing scheme.

In an embodiment, the method may further include driving the touch panel in a self-capacitance sensing scheme.

In embodiments of the invention, the display device additionally includes the proximity sensor, and the proximity sensor is driven with the negative voltage to increase a capacitance used for determining proximity with respect to a conductive object, so that accuracy of a proximity function and a call mode function may be improved.

In addition, in the embodiments of the invention, the display device stops displaying the image on the display panel in the call mode so that power consumption may be reduced, and allocates more system resources to a call function when the call mode is activated so that call quality may be improved.

In addition, in the embodiments of the invention, the display device includes the proximity sensor disposed in a bezel area that is conventionally including a dummy metal, so that space utilization may be improved.

BRIEF DESCRIPTION OF THE DRAWINGS

The above and other embodiments, advantages and features of this disclosure will become more apparent by describing in further detail embodiments thereof with reference to the accompanying drawings, in which.

DETAILED DESCRIPTION

Figure 1:
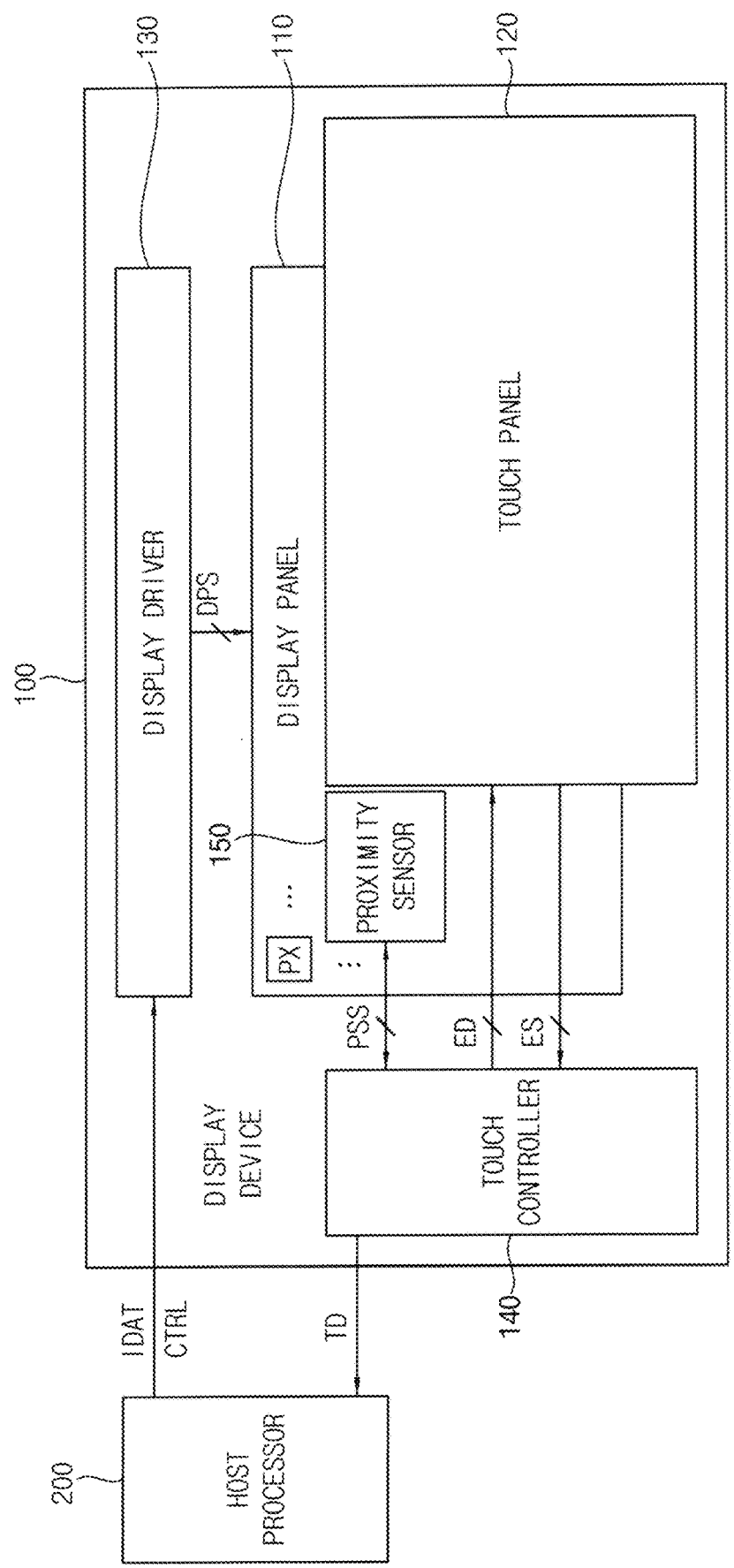
FIG. 1 is a block diagram illustrating a display device according to the invention.

Hereinafter, embodiments of the invention will be explained in detail with reference to the accompanying drawings. The same reference numerals will be used for the same elements in the drawings, and redundant descriptions of the same elements will be omitted.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this invention will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein. Terms such as "block" may refer to a circuit or processor, for example.

Figure 2:
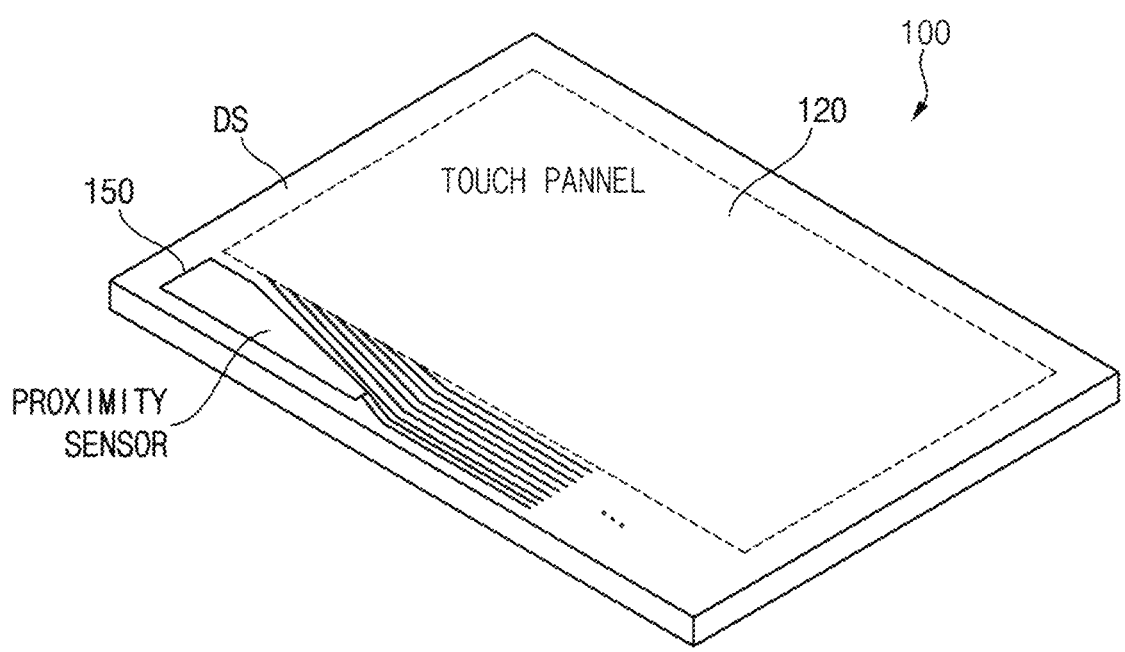
FIG. 2 is a schematic diagram illustrating an embodiment of display devices according to the invention.

FIG. 1 is a block diagram illustrating an embodiment of a display device in an embodiment of the invention, and FIG. 2 is a schematic diagram illustrating an embodiment of display devices according to the invention.

Referring to FIGS. 1 and 2, a display device 100 may include a display panel 110 including a plurality of pixels PX, a touch panel 120 including a plurality of first electrodes and a plurality of second electrodes, a display driver 130 which drives the display panel 110, and a touch controller 140 which drives the touch panel 120. In this case, the display device 100 may further include a proximity sensor 150 adjacent to the touch panel 120.

The display panel 110 may be driven by the display driver 130 to display an image. The display panel 110 may include a plurality of data lines, a plurality of scan lines, and a plurality of pixels PX connected to the data lines and the scan lines. In an embodiment, the display panel 110 may further include a plurality of emission control lines. In an embodiment, the display panel 110 may be an organic light emitting diode display panel in which each pixel PX includes an organic light emitting diode. However, the display panel 110 is not limited to the organic light emitting diode display panel, and the display panel 110 may be any display panel, for example, a liquid crystal display ("LCD") panel, a light emitting diode ("LED") panel, a field emission display ("FED") panel, or the like.

In an embodiment, each pixel PX may include a plurality of transistors, a storage capacitor, and an organic light emitting diode. At least one of the transistors may transmit a data signal transmitted through the data line to the storage capacitor in response to a scan signal. At least one of the transistors may generate a driving current based on the data signal stored in the storage capacitor. At least one of the transistors may selectively form a current path from a first power supply voltage to a second power supply voltage in response to an emission control signal. The storage capacitor may store the data signal transmitted by the transistors. The organic light emitting diode may emit light based on the driving current generated by the transistors. In another embodiment, each pixel PX may have an arbitrary pixel structure including at least two transistors and at least one capacitor.

The display driver 130 may drive the display panel 110 based on input image data IDAT and a control signal CTRL provided from a host processor 200 (e.g., a graphic processing unit ("GPU"), or an application processor ("AP") including a GPU). In an embodiment, the input image data IDAT may be RGB data including red image data, green image data, and blue image data. In addition, in an embodiment, the control signal CTRL may include an input data enable signal, a master clock signal, a vertical synchronization signal, a horizontal synchronization signal, and the like, but is not limited thereto. The display driver 130 may drive the display panel 110 by generating a display panel driving signal DPS based on the input image data IDAT and the control signal CTRL, and providing the display panel driving signal DPS to the display panel 110. In an embodiment, the display panel driving signal DPS may include a scan signal, a data signal, and an emission control signal, and the display driver 130 may include a scan driver which provides the scan signal to the display panel 110, a data driver which provides the data signal to the display panel 110, an emission driver which provides the emission control signal to the display panel 110, and a timing controller which controls timing of the scan driver, the data driver, and the emission driver, but the configurations are not limited thereto.

In the embodiments of the invention, the display device 100 may support a call mode in which an image is not displayed on the display panel 110 as well as a normal mode in which an image is displayed on the display panel 110. In this case, the call mode of the display device 100 may refer to a mode in which an image is not displayed on the display panel 110. In detail, first, the display device 100 may be driven in the normal mode when the display device 100 is powered on, and a driving mode of the display device 100 may be switched from the normal mode to the call mode when a predetermined condition is satisfied. In an embodiment, a mode of the display device 100 may be switched from the normal mode to the call mode when a capacitance of an internal electrode of the display device 100 changes. In an embodiment, when a conductive object approaches the proximity sensor 150 within a predetermined distance or less, the display device 100 may operate a proximity function, for example. When the display device 100 operates the proximity function, the display device 100 may measure a shortest distance from proximity sensor 150 to the conductive object based on a variation in a capacitance of the internal electrode included in the display device 100. In this case, when the conductive object approaches the proximity sensor 150 by the predetermined distance or less, the display device 100 may be switched to the call mode. When the display device 100 enters the call mode, the display panel 110 may stop displaying the image.

The touch panel 120 may be a capacitance-type touch panel which senses a capacitance variation caused by a touch of a conductive object (e.g., a finger, a stylus pen, etc.). In an embodiment, the touch panel 120 may include a plurality of first electrodes extending in a first direction (e.g., horizontal direction in FIG. 3) and a plurality of second electrodes extending in a second direction (e.g., vertical direction in FIG. 3) that is orthogonal to the first direction, for example. In an embodiment, a layer in which the first electrodes are disposed and a layer in which the second electrodes are disposed may be different from each other. In this case, each of the first electrodes and the second electrodes may have a straight-line shape. In another embodiment, the first electrodes and the second electrodes may be disposed in substantially the same layer. In this case, each of the first electrodes and the second electrodes may have a structure in which a plurality of polygons, which are consecutively arranged and having diamond shapes, respectively, are connected to each other, but is not limited thereto. In addition, in some embodiments, the touch panel 120 may be an add-on type touch panel attached onto the display panel 110, or an embedded-type touch panel disposed inside the display panel 110. In an embodiment, the touch panel 120 may be an on-cell type embedded touch panel or an in-cell type embedded touch panel, for example, but is not limited thereto.

The touch controller 140 may drive the touch panel 120 to detect a touch and/or proximity with respect to a conductive object. In the display device 100 in an embodiment of the invention, the touch controller 140 may drive the touch panel 120 in a mutual capacitance sensing scheme or a self-capacitance sensing scheme. In an embodiment, the touch controller 140 may perform a touch sensing operation in the mutual capacitance sensing scheme by sensing variations in mutual capacitances between the first electrodes and the second electrodes. In another embodiment, the touch controller 140 may perform a touch sensing operation in the self-capacitance sensing scheme by sensing variations in self-capacitances of the second electrodes (or capacitances between the second electrodes and the conductive object), or may perform the touch sensing operation in the self-capacitance sensing scheme by sensing variations in self-capacitances of the first electrodes (or capacitances between the first electrodes and the conductive object).

In an embodiment, the touch controller 140 may drive the touch panel 120 in the self-capacitance sensing scheme to detect that the conductive object approaches the touch panel 120. When the conductive object approaches the proximity sensor 150 by a predetermined distance or less, the mode of the display device 100 may be switched from the normal mode to the call mode. The touch panel 120 driven in the mutual capacitance sensing scheme may detect the touch of the conductive object only when the conductive object touches the touch panel 120, while the touch panel 120 driven in the self-capacitance sensing scheme may detect proximity with respect to the conductive object when the conductive object approaches the touch panel 120 before the conductive object touches the touch panel 120. In an embodiment, the touch controller 140 may include a first electrode control block and a second electrode control block. The first electrode control block may be connected to the first electrode through driving lines and sensing lines. The second electrode control block may be connected to the second electrode through driving lines and sensing lines. The touch controller 140 may provide both the mutual capacitance sensing scheme and the self-capacitance sensing scheme by controlling the first electrode control block and the second electrode control block.

The proximity sensor 150 may detect the proximity with respect to the conductive object based on a variation in a capacitance of an internal electrode of the proximity sensor 150. In the display device 100 in an embodiment of the invention, the touch controller 140 may operate the proximity function when the conductive object approaches the proximity sensor 150 within a predetermined distance or less. When the proximity function is operated, the proximity sensor 150 may measure a shortest distance from proximity sensor 150 to the conductive object based on the variation in the capacitance of the internal electrode included in the proximity sensor 150. In this case, when the conductive object approaches the proximity sensor 150 by the predetermined distance or less, the display device 100 may be switched to the call mode. Referring to FIG. 2, the proximity sensor 150 may be disposed on one side of wires of the touch panel 120. In addition, the proximity sensor 150 may be spaced apart from the electrodes included in the touch panel 120. In an embodiment, the proximity sensor 150 may be disposed in a bezel area DS of the display panel 110 in which an image is not displayed, for example. According to such arrangement of the proximity sensor 150, the display device 100 may include the proximity sensor 150 without reducing an image display area of the display panel 110. In addition, the proximity sensor 150 may be provided instead of an existing dummy metal, so that the display device 100 may determine a status of connection between an input node and an output node of the proximity sensor 150. A predetermined operation of the proximity sensor 150 will be described with reference to FIGS. 3 to 5.

Figure 3:
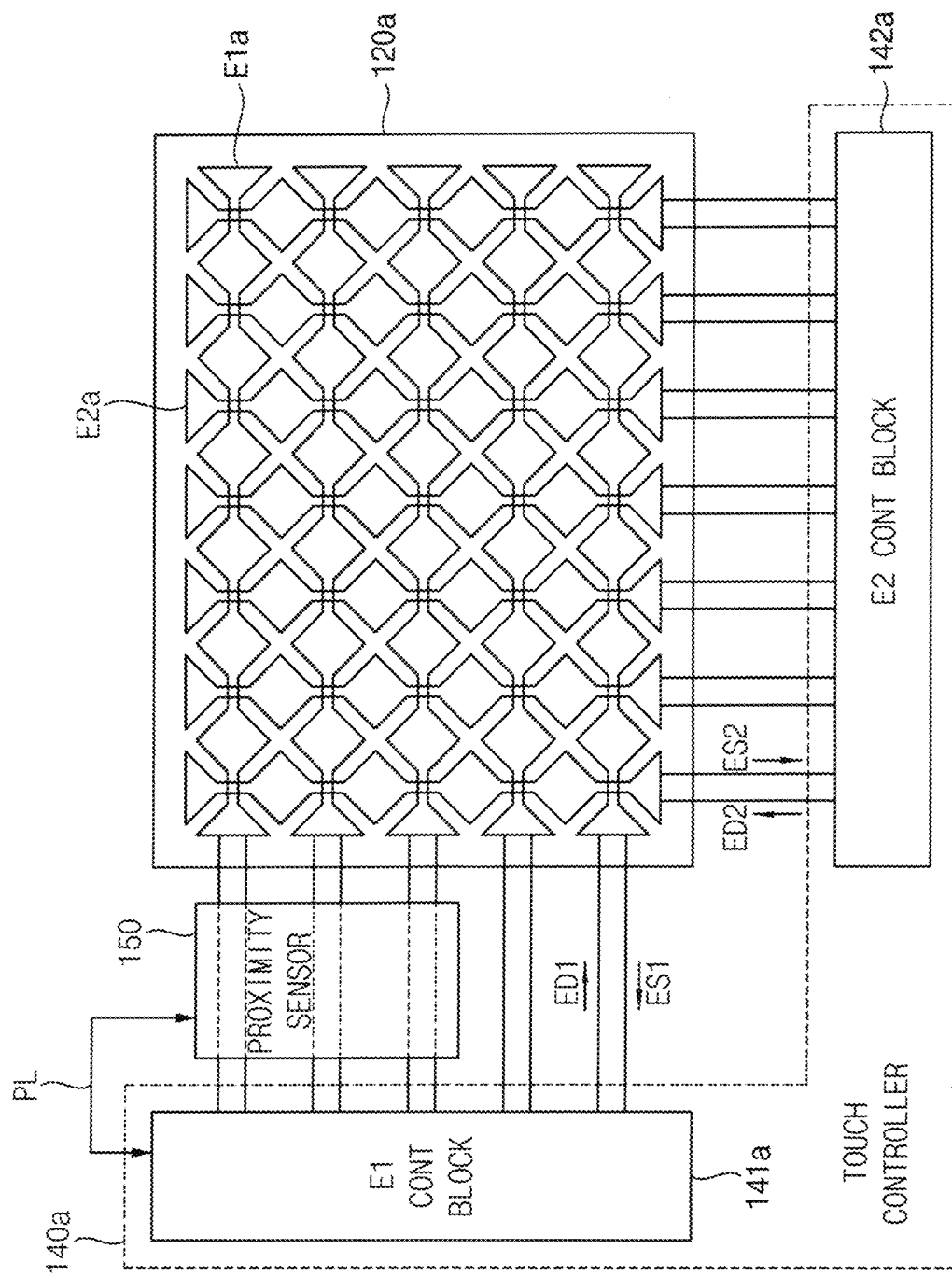
FIG. 3 is a block diagram illustrating an embodiment of a part of the display device according to the invention.
Figure 4:
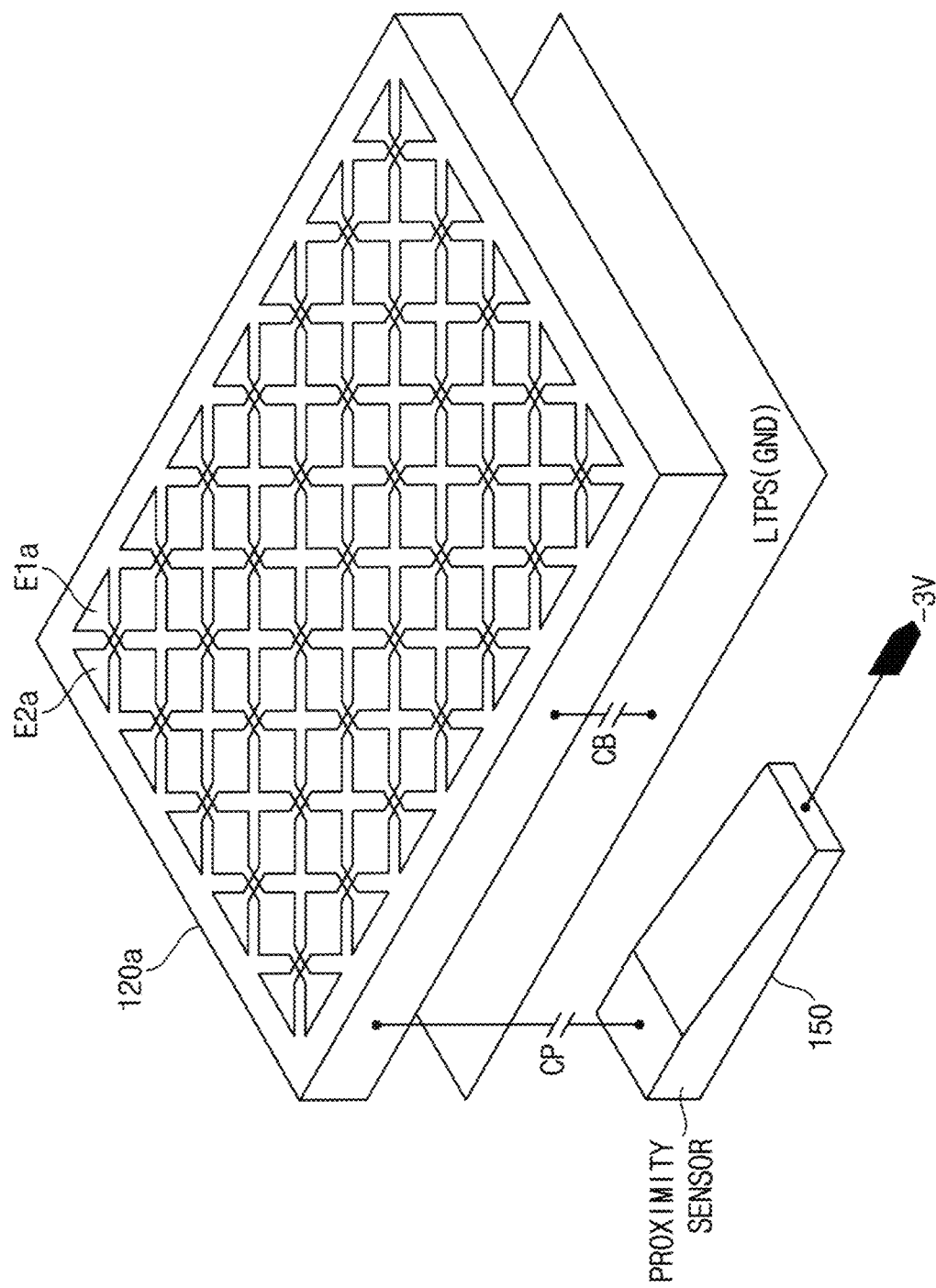
FIG. 4 is a schematic diagram illustrating one side of a touch panel and a proximity sensor of FIG. 3.
Figure 5:
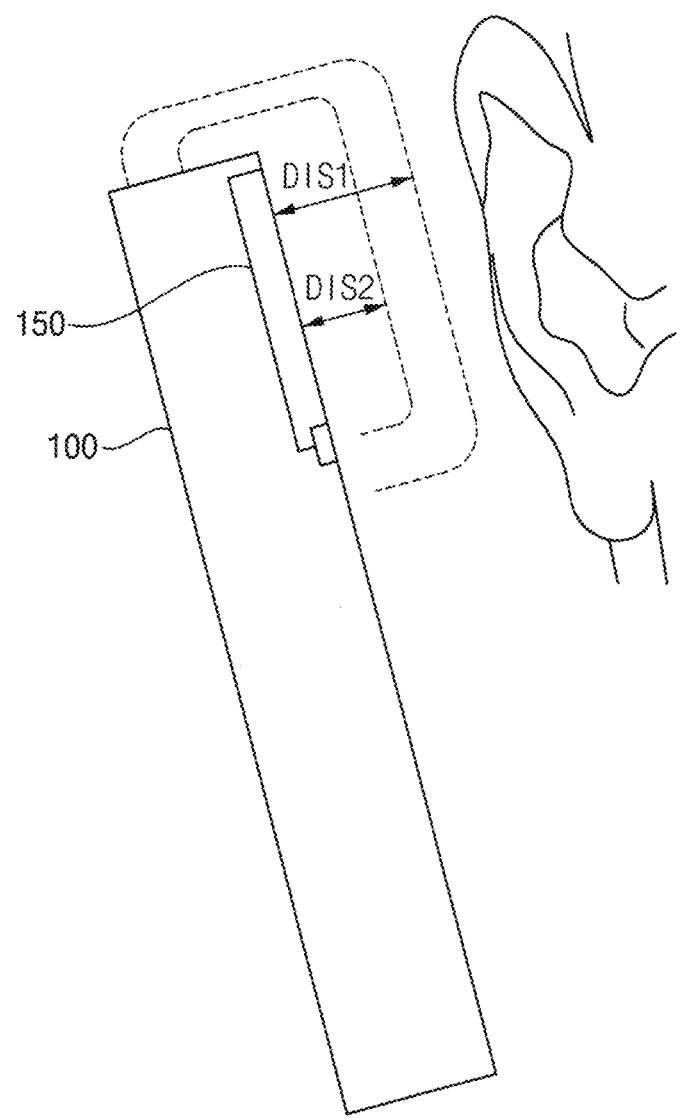
FIG. 5 is a diagram illustrating an example in which the display device of the invention is used.

FIG. 3 is a block diagram illustrating an embodiment of a part of the display device according to the invention. FIG. 4 is a schematic diagram illustrating one side of a touch panel and a proximity sensor of FIG. 3. FIG. 5 is a diagram illustrating an example in which the display device of the invention is used.

Referring to FIGS. 1 and 3, the display device 100 may include a touch panel 120a including a plurality of first electrodes and a plurality of second electrodes, a touch controller 140a which drives the touch panel 120a, and a proximity sensor 150 adjacent to the touch panel 120a. The touch controller 140a may be connected to the touch panel 120a through the first electrodes and the second electrodes. In detail, the touch panel 120a may include a plurality of first electrodes E1a extending in a first direction, and a plurality of second electrodes E2a extending in a second direction that is orthogonal to the first direction. In this case, the first electrodes E1a and the second electrodes E2a included in the touch panel 120a may be disposed in substantially the same layer. In this case, each of the first electrodes E1a and the second electrodes E2a may have a structure in which a plurality of polygons, which are consecutively arranged and having diamond shapes, respectively, are connected to each other.

In an embodiment, the touch controller 140a may include a first electrode control block 141a and a second electrode control block 142a. The first electrode control block 141a may be connected to the first electrode E1a through first driving lines and first sensing lines, and the second electrode control block 142a may be connected to the second electrode E2a through second driving lines and second sensing lines. The touch controller 140a may provide both the mutual capacitance sensing scheme and the self-capacitance sensing scheme by controlling the first electrode control block 141a and the second electrode control block 142a.

The first electrode control block 141a may sequentially apply first driving signals ED1 to the first electrodes E1a. In an embodiment, each of the first driving signals ED1 may be one or more consecutive voltage pulses, for example, but is not limited thereto. In an embodiment, each of the first driving signals ED1 may have various forms such as a sine wave and a triangular wave, for example. When the conductive object is adjacent to the first electrodes E1a or contacts the first electrodes E1a, a capacitance of each of the first electrodes E1a may be changed. The first electrode control block 141a may sense the first sensing signals ES1 based on variations in the capacitances of the first electrodes E1a. In this case, the first sensing signals ES1 may include capacitance variation values of the first electrodes E1a, respectively. The second electrode control block 142a may sequentially apply second driving signals ED2 to the second electrodes E2a. In an embodiment, each of the second driving signals ED2 may be one or more consecutive voltage pulses, for example, but is not limited thereto. In an embodiment, each of the second driving signals ED2 may have various forms such as a sine wave and a triangular wave, for example. When the conductive object is adjacent to the second electrodes E2a or contacts the second electrodes E2a, a capacitance of each of the second electrodes E2a may be changed. The second electrode control block 142a may sense the second sensing signals ES2 based on variations in the capacitances of the second electrodes E2a. In this case, the second sensing signals ES2 may include capacitance variation values of the second electrodes E2a, respectively.

The touch controller 140a may generate touch data TD (refer to FIG. 1) based on the first sensing signals ES1 and the second sensing signals ES2. In detail, the touch controller 140a may generate the touch data TD that indicates a touch location of the conductive object by sensing a capacitance variation induced by capacitive coupling between the first electrodes E1a and the second electrodes E2a based on the first sensing signals ES1 and the second sensing signals ES2. The touch controller 140a may provide the touch data TD to the host processor 200. In an embodiment, when the conductive object touches the touch panel 120a, a mutual capacitance between the first electrode E1a and the second electrode E2a corresponding to the touch location may be changed (e.g., reduced), for example. In this case, the touch controller 140a may sense a location at which the mutual capacitance is reduced, that is, the touch location by merging the capacitance variation values of the first electrodes E1a and the second electrodes E2a included in the first sensing signals ES1 and the second sensing signals ES2, respectively, and detecting a reduced capacitance between the first electrode E1a and the second electrode E2a from the merged the capacitance variation values.

The proximity sensor 150 may be disposed on one side of wires of the touch panel 120a. The proximity sensor 150 may be spaced apart from the first and second electrodes E1a and E2a included in the touch panel 120a. In an embodiment, the proximity sensor 150 may be disposed in the bezel area DS of the display panel 110 in which an image is not displayed, for example. The proximity sensor 150 may be connected to the touch controller 140a through a proximity sensing line PL. The touch controller 140a and the proximity sensor 150 may transmit and receive a proximity sensing signal PSS (refer to FIG. 1) through the proximity sensing line PL. The touch controller 140a may determine the proximity with respect to the conductive object based on the proximity sensing signal PSS received from the proximity sensor 150.

Referring to FIGS. 3 to 5, the proximity sensor 150 may detect the proximity with respect to the conductive object based on the variation in the capacitance of the internal electrode of the proximity sensor 150. In detail, in the display device 100 in an embodiment of the invention, the touch controller 140a may operate the proximity function when the conductive object approaches the proximity sensor 150 within a predetermined distance or less. When the proximity function is operated, the proximity sensor 150 may measure the shortest distance from proximity sensor 150 to the conductive object based on the variation in the capacitance of the internal electrode included in the proximity sensor 150. In this case, when the conductive object approaches the proximity sensor 150 by the predetermined distance or less, the display device 100 may be switched to the call mode.

In an embodiment, the touch controller 140a may provide a negative voltage to the proximity sensor 150 when the proximity sensor 150 detects that the conductive object approaches the proximity sensor 150 within a first reference distance DIS1 or less. In an embodiment, the touch controller 140a may provide a negative voltage to the proximity sensor 150 when the proximity sensor 150 detects that a shortest distance between the proximity sensor 150 and the conductive object is equal to or less than a first reference distance DIS1. In this case, the first reference distance DIS1 may be a minimum distance at which the display device 100 may operate the proximity function. In detail, when the shortest distance from the proximity sensor 150 to the conductive object is less than the first reference distance DIS1, the display device 100 may operate the proximity function. When the proximity function is operated, the touch controller 140a may determine the proximity with respect to the conductive object through the proximity sensor 150, and may determine whether to activate the call mode. The display device 100 may activate the call mode when the shortest distance from proximity sensor 150 to the conductive object is less than a second reference distance DIS2. The second reference distance DIS2 may be an optimum distance between a user and the display device 100 when the user makes a call by the display device 100. When the call mode is activated, the display panel 110 may stop displaying an image, unlike the normal mode in which the image is displayed. In an embodiment, the proximity sensor 150 may detect the proximity with respect to the conductive object by detecting a variation in a capacitance between the internal electrode of the proximity sensor 150 and the touch panel 120a, for example. When the conductive object is adjacent to the proximity sensor 150 or contacts the proximity sensor 150, a mutual capacitance between internal electrodes of the proximity sensor 150 and the first and second electrodes E1a and E2a of the touch panel 120a may be changed (e.g., reduced). As shown in FIG. 5, when the proximity sensor 150 detects that the conductive object approaches the proximity sensor 150 within the first reference distance DIS1 or less, the touch controller 140a may operate the proximity function. In an embodiment, when the proximity function is operated, the touch controller 140a may provide a negative voltage (e.g., a voltage of about −3 volts (V)) to the proximity sensor 150. When the proximity sensor 150 is driven with the negative voltage, a variation in the mutual capacitance between the proximity sensor 150 and the first and second electrodes E1a and E2a of the touch panel 120a may be increased, so that the shortest distance from proximity sensor 150 to the conductive object that may be detected by the proximity sensor 150 may be increased. Therefore, ability of the proximity sensor 150 to detect the proximity with respect to the conductive object may be improved. As shown in FIG. 5, when the proximity sensor 150 detects that the conductive object approaches the proximity sensor 150 within the second reference distance DIS2 or less, the touch controller 140a may provide the touch data TD to the host processor 200. The second reference distance DIS2 may be smaller than the first reference distance DIS1. In this case, the display device 100 may activate the call mode, and the display panel 110 may stop displaying the image. When the user makes a call by the display device 100, the display panel 110 may stop displaying the image, so that power consumption caused by displaying the image on the display panel 110 may be reduced.

In an embodiment, the proximity sensor 150 may include internal electrodes. The touch controller 140a may determine whether to operate the proximity function and whether to activate the call mode by detecting the variation in the capacitance between the internal electrode of the proximity sensor 150 and the touch panel 120a. When the conductive object is adjacent to the proximity sensor 150 or contacts the proximity sensor 150, a mutual capacitance between the internal electrodes of the proximity sensor 150 and the first and second electrodes E1a and E2a of the touch panel 120a may be changed. In this case, as the variation in the capacitance between the internal electrode of the proximity sensor 150 and the touch panel 120a increases, the proximity with respect to the conductive object may be determined more accurately, so that the proximity function of the touch controller 140a may be improved. Referring to FIG. 4, a mutual capacitance CP may be generated between the internal electrodes of the proximity sensor 150 and the first and second electrodes E1a and E2a of the touch panel 120a. Each of the first and second electrodes E1a and E2a of the touch panel 120a may have a mutual capacitance CB. Therefore, when the touch controller 140a operates the proximity function through the proximity sensor 150, a total amount of an overall mutual capacitance that is the basis for determining the proximity may be the sum (CP+CB) of the mutual capacitance CP between the internal electrodes of the proximity sensor 150 and the first and second electrodes E1a and E2a of the touch panel 120a and the mutual capacitance CB of each of the first and second electrodes E1a and E2a of the touch panel 120a. According to the display device 100 of the invention, the proximity sensor 150 is driven with the negative voltage when the proximity function is operated, and a capacitance corresponding to the mutual capacitance CP between the internal electrodes of the proximity sensor 150 and the first and second electrodes E1a and E2a of the touch panel 120a is further provided, so that an improved call mode function may be provided. In an embodiment, the touch controller 140a may provide a voltage of about 0 V to the proximity sensor 150 when detecting that the conductive object moves away from the proximity sensor 150 by a shortest distance that is greater than or equal to the first reference distance DIS1, for example. In other words, the touch controller 140a may not operate the proximity function through the proximity sensor 150 when detecting that the conductive object moves away from the proximity sensor 150 by the distance that is greater than or equal to the first reference distance DIS1. In an embodiment, a low-temperature polysilicon ("LTPS") layer to which a ground voltage GND is applied may be disposed under the touch panel 120a.

Referring to FIGS. 1 to 5, the touch controller 140a may provide the touch data TD to the host processor 200 when detecting that the conductive object (e.g., a face of the user) approaches the proximity sensor 150 within the second reference distance DIS2 or less. The display driver 130 may drive the display panel 110 based on the input image data IDAT and the control signal CTRL provided from the host processor 200. The control signal CTRL provided to the display driver 130 from the host processor 200 may include a call mode activation signal. The display driver 130 may drive the display panel 110 by generating the display panel driving signal DPS based on the input image data IDAT and the control signal CTRL, and providing the display panel driving signal DPS to the display panel 110. When the display driver 130 receives the call mode activation signal from the host processor 200, the display driver 130 may allow the display panel 110 to stop displaying an image. The display device 100 may stop displaying the image on the display panel 110, so that power consumption may be reduced. In addition, in some embodiments, the display device 100 may allocate more system resources to a call function in the call mode, so that call quality may be improved. Therefore, according to the display device of the embodiment of the invention, the power consumption may be reduced. In addition, according to the display device of the embodiment of the invention, the call quality may be improved.

Figure 6:
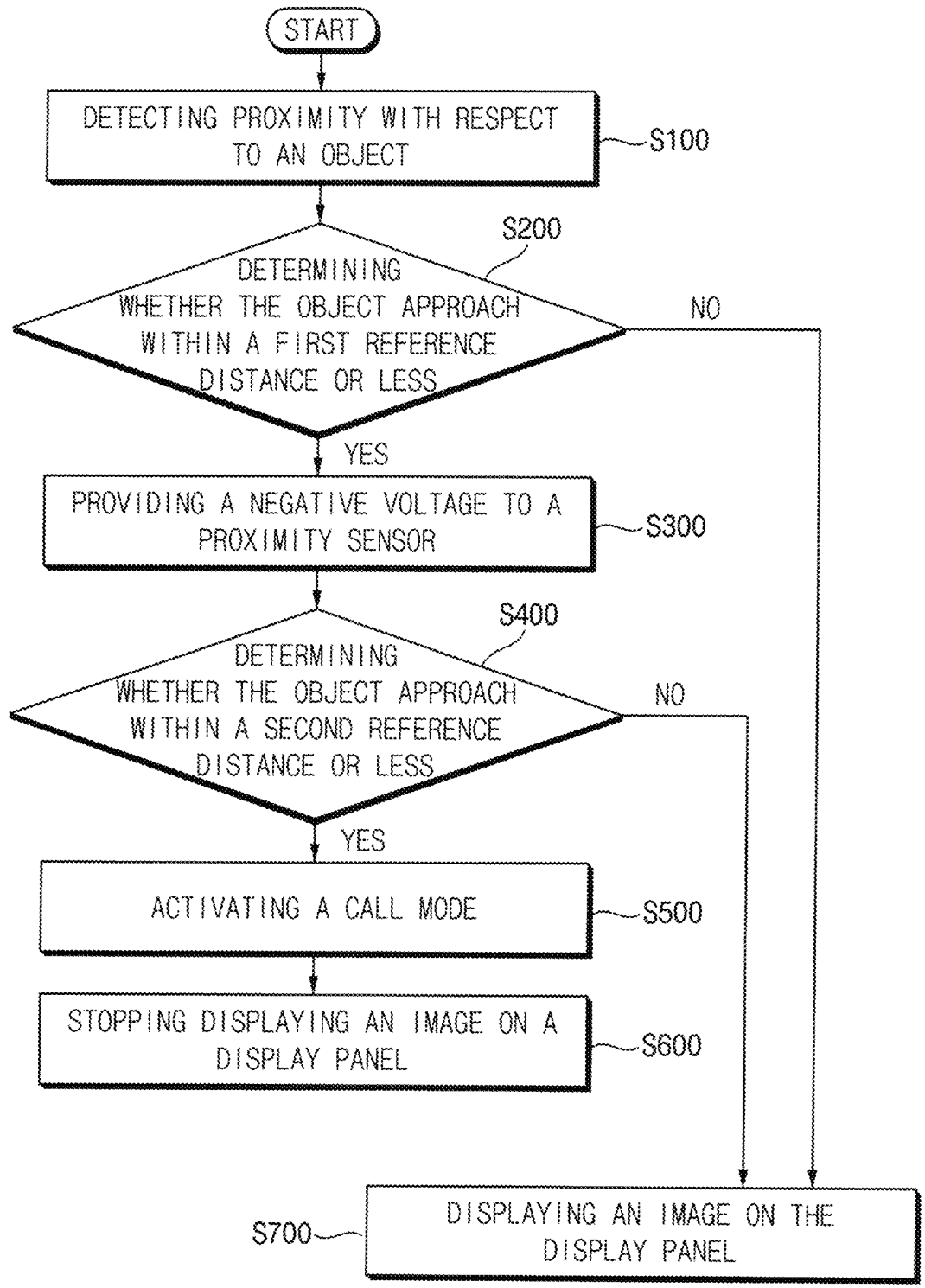
FIG. 6 is a flowchart illustrating an embodiment of a method of driving a display device according to the invention.

FIG. 6 is a flowchart illustrating an embodiment of a method of driving a display device according to the invention.

Referring to FIGS. 1 to 6, according to the invention, the display device 100 may detect the proximity with respect to the conductive object (S100), determine whether the conductive object approaches the proximity sensor 150 within the first reference distance DIS1 or less (S200), and provide the negative voltage to the proximity sensor 150 when the object approaches the proximity sensor 150 within the first reference distance DIS1 or less (S300). In this case, the display device 100 may determine whether the conductive object approaches the proximity sensor 150 within the second reference distance DIS2 or less (S400), activate the call mode when the object approaches the proximity sensor 150 within the second reference distance DIS2 or less (S500), and stop displaying the image on the display panel 110 (S600). The display device 100 may display the image on the display panel 110 when the object does not approach the proximity sensor 150 within the first reference distance DIS1 or less or the object does not approach the proximity sensor 150 within the second reference distance DIS2 or less (S700).

In an embodiment, the proximity sensor 150 included in the display device 100 may detect the proximity with respect to the object based on a capacitance variation (S100). The touch controller 140 may determine whether the conductive object approaches the proximity sensor 150 within the first reference distance DIS1 or less (S200). In this case, the touch controller 140 may provide the negative voltage to the proximity sensor 150 when the conductive object approaches the proximity sensor 150 within the first reference distance DIS1 or less (S300). In detail, the touch controller 140 may operate the proximity function when the conductive object approaches the proximity sensor 150 within a predetermined distance or less. When the proximity function is operated, the proximity sensor 150 may measure the shortest distance from proximity sensor 150 to the conductive object based on the variation in the capacitance of the internal electrode included in the proximity sensor 150. In an embodiment, the touch controller 140 may provide the negative voltage to the proximity sensor 150 when the proximity sensor 150 detects that the conductive object approaches the proximity sensor 150 within the first reference distance DIS1 or less, for example. In this case, a value of the negative voltage provided to the proximity sensor 150 may be about −3 V, for example. The first reference distance DIS1 may be a minimum distance at which the display device 100 may operate the proximity function. When the proximity function is operated, the touch controller 140 may determine the proximity with respect to the conductive object through the proximity sensor 150, and may determine whether to activate the call mode. In an embodiment, when the proximity sensor 150 is driven with the negative voltage (e.g., about −3 V), the variation in the mutual capacitance between the proximity sensor 150 and the first and second electrodes E1a and E2a of the touch panel may be increased, so that the shortest distance from proximity sensor 150 to the conductive object that may be detected by the proximity sensor 150 may be increased. Therefore, the display device 100 may provide a proximity function with improved accuracy as compared with a conventional display device.

In an embodiment, the touch controller 140 included in the display device 100 may determine whether the conductive object approaches the proximity sensor 150 within the second reference distance DIS2 or less (S400). In this case, the touch controller 140 may activate the call mode when the conductive object approaches the proximity sensor 150 within the second reference distance DIS2 or less (S500). When the call mode is activated, the display panel 110 may stop displaying the image (S600). In detail, the display device 100 may support a call mode in which an image is not displayed on the display panel 110 as well as a normal mode in which an image is displayed on the display panel 110. In an embodiment, first, the display device 100 may be driven in the normal mode when the display device 100 is powered on, and the driving mode of the display device 100 may be switched from the normal mode to the call mode when the conductive object approaches the proximity sensor 150 by the second reference distance DIS2 or less, for example. The second reference distance DIS2 may be an optimum distance between the user and the display device 100 when the user makes a call by the display device 100. The mode of the display device 100 may be switched from the normal mode to the call mode when the capacitance of the internal electrode of the proximity sensor 150 changes. In an embodiment, when detecting that the conductive object (e.g., the face of the user) approaches the proximity sensor 150 within the second reference distance DIS2 or less, the touch controller 140 may provide the touch data TD to the host processor 200, for example. The touch data TD may include a call mode activation signal. When the display driver 130 receives the call mode activation signal from the host processor 200, the display driver 130 may allow the display panel 110 to stop displaying the image. Therefore, the display device 100 may stop displaying the image on the display panel 110 in the call mode so that the power consumption may be reduced, and may allocate more system resources to the call function when the call mode is activated so that the call quality may be improved.

The display device 100 may display the image on the display panel 110 when the object does not approach the proximity sensor 150 within the first reference distance DIS1 or less (S700). In addition, the display device 100 may display the image on the display panel 110 when the object does not approach the proximity sensor 150 within the second reference distance DIS2 or less (S700). In detail, the touch controller 140 may transmit a signal for deactivating the call mode to the host processor 200 when the conductive object moves away from the proximity sensor 150 by a shortest distance exceeding the second reference distance DIS2. In this case, the display driver 130 may determine whether to display the image on the display panel 110 according to an activation state of the call mode. In other words, when the signal for deactivating the call mode is received from the host processor 200, the display driver 130 may display the image on the display panel 110. In an embodiment, the touch controller 140 may provide a voltage of about 0 V to the proximity sensor 150 when the conductive object moves away from the proximity sensor 150 by a shortest distance exceeding the first reference distance DIS1, for example. In this case, since the touch controller 140 does not need to operate the proximity function, the touch controller 140 may not receive a separate signal from the proximity sensor 150. Therefore, the touch controller 140 may adjust the proximity function and the call mode function according to the proximity with respect to the conductive object, so that the power consumption caused by unnecessary operation of the proximity function and unnecessary activation of the call mode may be reduced when the conductive object does not approach the proximity sensor 150.

As described above, the display device 100 may increase a capacitance used for determining the proximity with respect to the conductive object through the operation of the touch controller 140 and the arrangement of the proximity sensor 150. Therefore, the display device 100 may provide the proximity function and the call mode function with improved accuracy as compared with the conventional display device. In addition, the display device 100 may stop displaying the image on the display panel 110 in the call mode so that the power consumption may be reduced, and may allocate more system resources to the call function when the call mode is activated so that the call quality may be improved.

Figure 7:
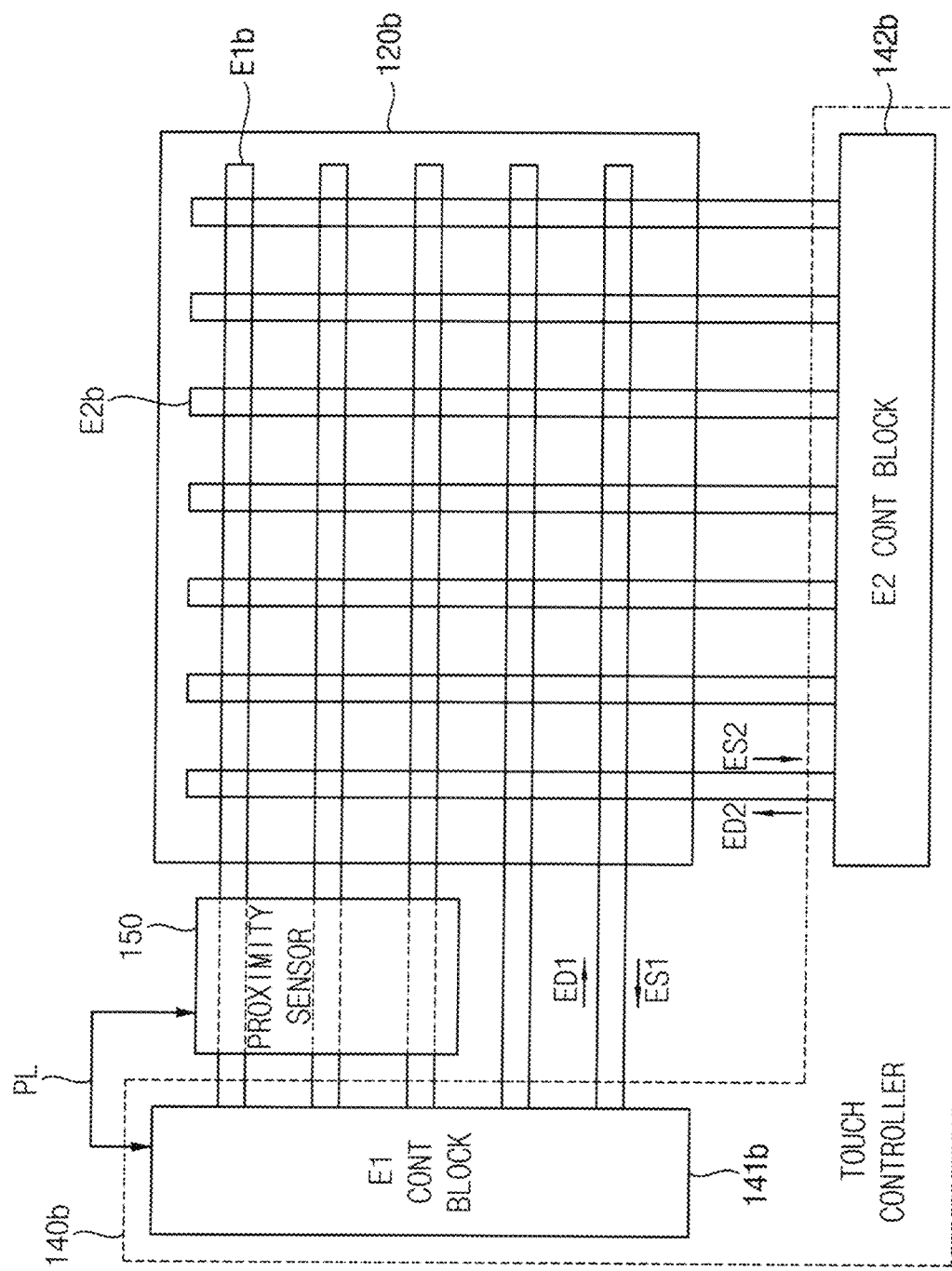
FIG. 7 is a block diagram illustrating an embodiment of a part of a display device according to the invention.
Figure 8:
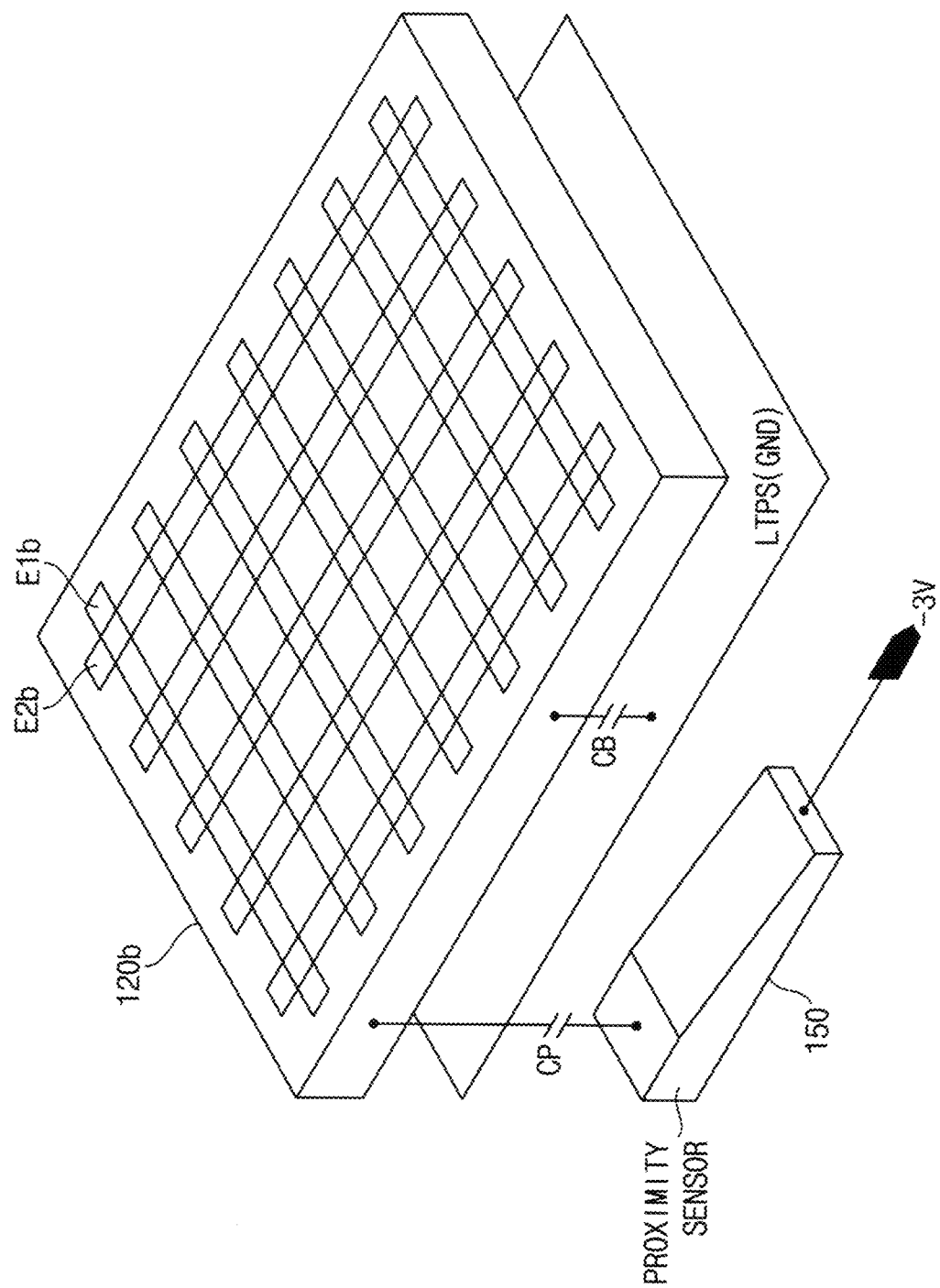
FIG. 8 is a schematic diagram illustrating one side of a touch panel and a proximity sensor of FIG. 7.

FIG. 7 is a block diagram illustrating an embodiment of a part of a display device according to the invention. FIG. 8 is a schematic diagram illustrating one side of a touch panel and a proximity sensor of FIG. 7.

Referring to FIGS. 1 and 7, a touch controller 140*b* may be connected to a touch panel 120*b* through a plurality of first line electrodes E1*b* and a plurality of second line electrodes E2*b*. The touch controller 140*b* may be connected to the proximity sensor 150 through the proximity sensing line PL. In detail, the touch panel 120*b* may include a plurality of first line electrodes E1*b* extending in a first direction (e.g., horizontal direction in FIG. 7), and a plurality of second line electrodes E2*b* extending in a second direction (e.g., vertical direction in FIG. 7) that is orthogonal to the first direction. In this case, a layer in which the first line electrodes E1*b* included in the touch panel 120*b* are disposed and a layer in which the second line electrodes E2*b* included in the touch panel 120*b* are disposed may be different from each other. In this case, each of the first line electrodes E1*b* and the second line electrodes E2*b* may have a straight-line shape.

In an embodiment, the touch controller 140*b* may include a first electrode control block 141*b* connected to the first line electrodes E1*b* and a second electrode control block 142*b* connected to the second line electrodes E2*b* so as to provide both the mutual capacitance sensing scheme and the self-capacitance sensing scheme. The first electrode control block 141*b* may sequentially apply first driving signals ED1 to the first line electrodes E1*b*. In an embodiment, each of the first driving signals ED1 may be one or more consecutive voltage pulses, but is not limited thereto, for example. In an embodiment, each of the first driving signals ED1 may have various forms such as a sine wave and a triangular wave, for example. When the conductive object is adjacent to the first line electrodes E1*b* or contacts the first line electrodes E1*b*, a capacitance of each of the first line electrodes E1*b* may be changed. The first electrode control block 141*b* may sense the first sensing signals ES1 based on variations in the capacitances of the first line electrodes E1*b*. In this case, the first sensing signals ES1 may include capacitance variation values of the first line electrodes E1*b*, respectively. The second electrode control block 142*b* may sequentially apply second driving signals ED2 to the second line electrodes E2*b*. In an embodiment, each of the second driving signals ED2 may be one or more consecutive voltage pulses, for example, but is not limited thereto. In an embodiment, each of the second driving signals ED2 may have various forms such as a sine wave and a triangular wave, for example. When the conductive object is adjacent to the second line electrodes E2*b* or contacts the second line electrodes E2*b*, a capacitance of each of the second line electrodes E2*b* may be changed. The second electrode control block 142*b* may sense the second sensing signals ES2 based on variations in the capacitances of the second line electrodes E2*b*. In this case, the second sensing signals ES2 may include capacitance variation values of the second line electrodes E2*b*, respectively.

The touch controller 140*b* may generate touch data TD based on the first sensing signals ES1 and the second sensing signals ES2. In detail, the touch controller 140*b* may generate the touch data TD that indicates a touch location of the conductive object by sensing a capacitance variation induced by capacitive coupling between the first line electrodes E1*b* and the second line electrodes E2*b* based on the first sensing signals ES1 and the second sensing signals ES2. The touch controller 140*b* may provide the touch data TD to the host processor 200. In an embodiment, when the conductive object touches the touch panel 120b, a mutual capacitance between the first line electrode E1b and the second line electrode E2b corresponding to the touch location may be changed (e.g., reduced), for example. In this case, the touch controller 140b may sense a location at which the mutual capacitance is reduced, that is, the touch location by merging the capacitance variation values of the first line electrodes E1b and the second line electrodes E2b included in the first sensing signals ES1 and the second sensing signals ES2, respectively, and detecting a reduced capacitance between the first line electrode E1b and the second line electrode E2b from the merged capacitance variation values.

The proximity sensor 150 may be disposed on one side of wires of the touch panel 120b. The proximity sensor 150 may be spaced apart from the first and second line electrodes E1b and E2b included in the touch panel 120b. In an embodiment, the proximity sensor 150 may be disposed in the bezel area DS of the display panel 110 in which an image is not displayed, for example. The proximity sensor 150 may be connected to the touch controller 140b through the proximity sensing line PL. The touch controller 140b and the proximity sensor 150 may transmit and receive a proximity sensing signal PSS (refer to FIG. 1) through the proximity sensing line PL. The touch controller 140b may determine the proximity with respect to the conductive object based on the proximity sensing signal PSS received from the proximity sensor 150.

Referring to FIGS. 7 and 8, the proximity sensor 150 may include internal electrodes. The touch controller 140b may determine whether to operate the proximity function and whether to activate the call mode by detecting a variation in a capacitance between the internal electrode of the proximity sensor 150 and the touch panel 120b. When the conductive object is adjacent to the proximity sensor 150 or contacts the proximity sensor 150, a mutual capacitance between the internal electrodes of the proximity sensor 150 and the first and second line electrodes E1b and E2b of the touch panel 120b may be changed. In this case, as the variation in the capacitance between the internal electrode of the proximity sensor 150 and the touch panel 120b increases, the proximity with respect to the conductive object may be determined more accurately, so that the proximity function of the touch controller 140b may be improved. Referring to FIG. 8, a mutual capacitance CP may be generated between the internal electrodes of the proximity sensor 150 and the first and second line electrodes E1b and E2b of the touch panel 120b. Each of the first and second line electrodes E1b and E2b of the touch panel 120b may have a mutual capacitance CB. Therefore, when the touch controller 140b operates the proximity function through the proximity sensor 150, a total amount of an overall mutual capacitance that is the basis for determining the proximity may be the sum (CP+CB) of the mutual capacitance CP between the internal electrodes of the proximity sensor 150 and the first and second line electrodes E1b and E2b of the touch panel 120b and the mutual capacitance CB of each of the first and second line electrodes E1b and E2b of the touch panel 120b. According to the display device 100 of the invention, the proximity sensor 150 is driven with a negative voltage when the proximity function is operated, and a capacitance corresponding to the mutual capacitance CP between the internal electrodes of the proximity sensor 150 and the first and second line electrodes E1b and E2b of the touch panel 120b is further provided, so that an improved call mode function may be provided. In an embodiment, the touch controller 140b may provide a voltage of about 0 V to the proximity sensor 150 when detecting that the conductive object moves away from the proximity sensor 150 by a shortest distance that is greater than or equal to the first reference distance DIS1, for example. In other words, the touch controller 140b may not operate the proximity function through the proximity sensor 150 when detecting that the conductive object moves away from the proximity sensor 150 by the distance that is greater than or equal to the first reference distance DIS1.

As described above, the display device 100 may increase a capacitance used for determining the proximity with respect to the conductive object through the operation of the touch controller 140b and the arrangement of the proximity sensor 150. Therefore, the display device 100 may provide the proximity function and the call mode function with improved accuracy as compared with the conventional display device. In addition, the display device 100 may stop displaying the image on the display panel 110 in the call mode so that the power consumption may be reduced, and may allocate more system resources to the call function when the call mode is activated so that the call quality may be improved.

Figure 9:
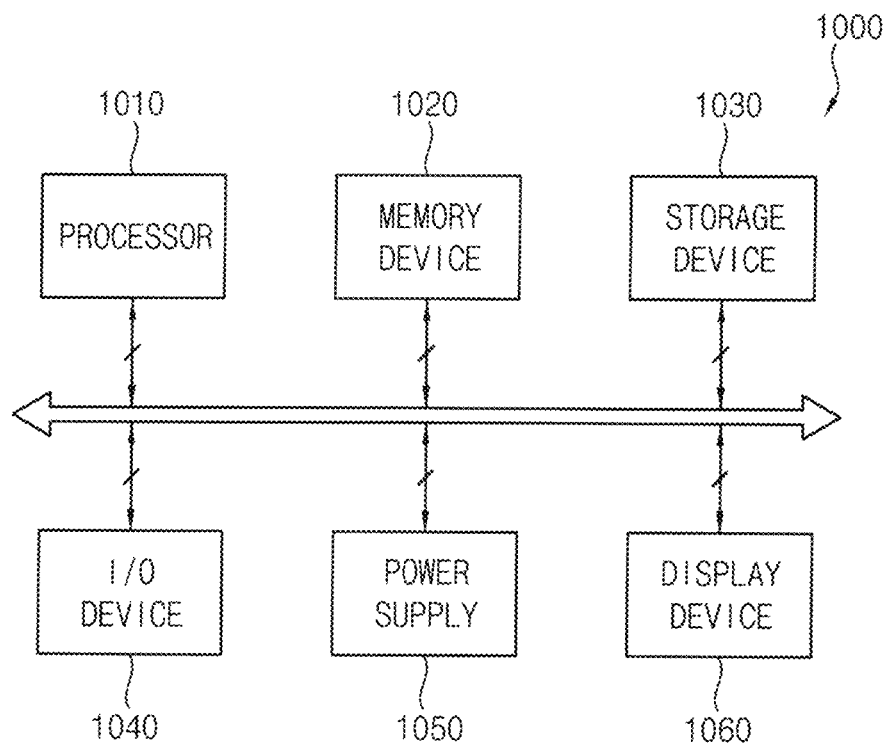
FIG. 9 is a block diagram illustrating an embodiment of an electronic device according to the invention.
Figure 10:
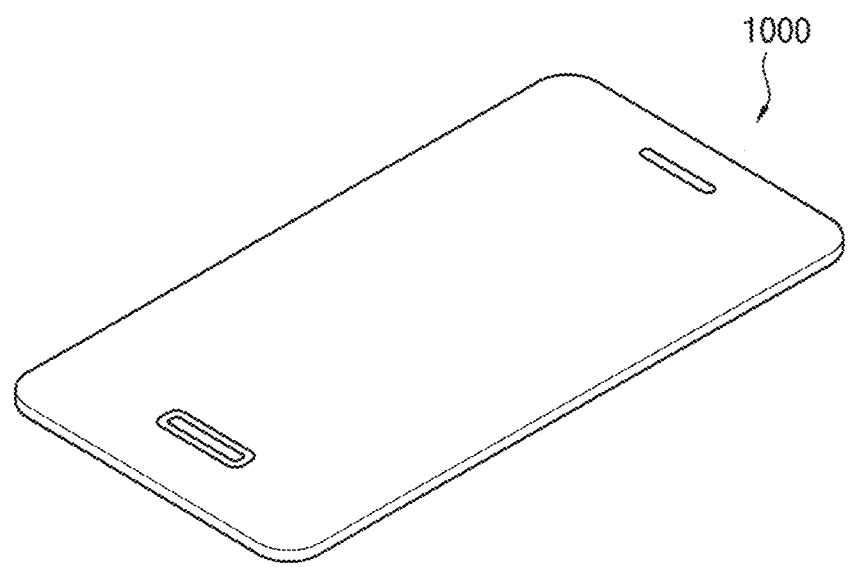
FIG. 10 is a diagram illustrating an example in which the electronic device of FIG. 9 is implemented as a smartphone.

FIG. 9 is a block diagram illustrating an embodiment of an electronic device according to the invention. FIG. 10 is a diagram illustrating an example in which the electronic device of FIG. 9 is implemented as a smart phone.

Referring to FIGS. 9 and 10, the electronic device 1000 may include a processor 1010, a memory device 1020, a storage device 1030, an input/output ("I/O") device 1040, a power supply 1050, and a display device 1060. In addition, the electronic device 1000 may further include a plurality of ports for communicating with a video card, a sound card, a memory card, a universal serial bus ("USB") device, other electronic device, and the like. In an embodiment, as illustrated in FIG. 10, the electronic device 1000 may be implemented as a smart phone. However, the electronic device 1000 is not limited thereto. In an embodiment, the electronic device 1000 may be implemented as a cellular phone, a video phone, a smart pad, a smart watch, a tablet personal computer ("PC"), a car navigation system, a computer monitor, a laptop, a head mounted display ("HMD") device, and the like, for example.

The processor 1010 may perform various computing functions. The processor 1010 may be a microprocessor, a central processing unit ("CPU"), an application processor ("AP"), and the like. The processor 1010 may be coupled to other components via an address bus, a control bus, a data bus, and the like. Further, the processor 1010 may be coupled to an extended bus such as a peripheral component interconnection ("PCI") bus. The memory device 1020 may store data for operations of the electronic device 1000. In an embodiment, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like. The storage device 1030 may include a solid state drive ("SSD") device, a hard disk drive ("HDD") device, a CD-ROM device, and the like, for example. In an embodiment, the I/O device 1040 may include an input device such as a keyboard, a keypad, a mouse device, a touch-pad, a touch-screen, and the like, and an output device such as a printer, a speaker, and the like, for example. In some embodiments, the I/O device 1040 may include the display device 1060. The power supply 1050 may provide power for operations of the electronic device 1000.

The display device 1060 may display an image corresponding to visual information of the electronic device 1000. The display device 1060 may include a display panel including a plurality of pixels, a touch panel including a plurality of electrodes, a proximity sensor which is adjacent to the touch panel and detects proximity with respect to an object based on a capacitance variation, a display driver which drives the display panel and a touch controller which drives the touch panel and the proximity sensor. The touch controller provides a negative voltage to the proximity sensor when the proximity sensor detects that the object approaches the proximity sensor within a first reference distance or less. Here, the proximity sensor may be disposed in a bezel area of the display panel in which an image is not displayed. By embodiments of the invention, the display device 1060 stops displaying the image on the display panel in the call mode so that power consumption may be reduced, and allocates more system resources to a call function when the call mode is activated so that call quality may be improved. In addition, the display device 1060 includes the proximity sensor disposed in a bezel area that is conventionally including a dummy metal, so that space utilization may be improved. However, since these are described above, duplicated description related thereto will not be repeated.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the predetermined embodiments disclosed, and that modifications to the disclosed embodiments, as well as other embodiments can be made within the inventive concept.

What is claimed is:

1. A display device which detects an object, the display device comprising:
   a display panel including pixels;
   a touch panel including electrodes;
   a proximity sensor which is adjacent to the touch panel and detects proximity with respect to the object based on a capacitance variation;
   a display driver which drives the display panel; and
   a touch controller which drives the touch panel and the proximity sensor,
   wherein the touch controller provides a negative voltage to the proximity sensor when the proximity sensor detects that the object approaches the proximity sensor such that a shortest distance from the object to the proximity sensor is equal to or less than a first reference distance.

2. The display device of claim 1, wherein the display panel stops displaying an image when the proximity sensor detects that the object approaches the proximity sensor such that the shortest distance from the object to the proximity sensor is equal to or less than a second reference distance, which is less than the first reference distance.

3. The display device of claim 2, wherein the proximity sensor is disposed on one side of wires of the touch panel while being spaced apart from the electrodes of the touch panel.

4. The display device of claim 2, wherein the touch controller provides a voltage of about 0 volt to the proximity sensor when the proximity sensor detects that the object moves away from the proximity sensor such that the shortest distance from the object to the proximity sensor is greater than or equal to the first reference distance.

5. The display device of claim 2, wherein the touch controller provides a voltage of about −3 volts to the proximity sensor when the proximity sensor detects that the object approaches the proximity sensor such that the shortest distance from the object to the proximity sensor is equal to or less than the first reference distance.

6. The display device of claim 5, wherein the touch controller activates a call mode of the display device when the proximity sensor detects that the object approaches the proximity sensor such that the shortest distance between the proximity sensor and the object is equal to or less than the second reference distance.

7. The display device of claim 5, wherein the proximity sensor is disposed in a bezel area of the display panel in which the image is not displayed.

8. The display device of claim 5, wherein the proximity sensor includes an input node and an output node, and the touch controller determines a status of connection between the input node and the output node of the proximity sensor.

9. The display device of claim 5, wherein the object is a face of a user, and
   the proximity sensor detects proximity with respect to the face of the user based on the capacitance variation.

10. The display device of claim 5, wherein the touch controller drives the touch panel in a mutual capacitance sensing scheme.

11. The display device of claim 5, wherein the touch controller drives the touch panel in a self-capacitance sensing scheme.

12. The display device of claim 5, wherein the display driver determines whether to display the image on the display panel according to an activation state of a call mode.

13. A method of driving a display device, the method comprising:
    detecting proximity with respect to an object based on a capacitance variation;
    driving a proximity sensor according to a proximity state of the object;
    providing a negative voltage to the proximity sensor when detecting that the object approaches the proximity sensor such that a shortest distance from the object to the proximity sensor is equal to or less than a first reference distance; and
    stopping displaying an image when detecting that the object approaches the proximity sensor such that the shortest distance from the object to the proximity sensor is equal to or less than a second reference distance, which is less than the first reference distance.

14. The method of claim 13, wherein the proximity sensor is disposed on one side of wires of the touch panel while being spaced apart from the electrodes of the touch panel.

15. The method of claim 13, wherein the driving the proximity sensor includes providing a voltage of about 0 volt to the proximity sensor when the proximity sensor detects that the object moves away from the proximity sensor such that the shortest distance from the object to the proximity sensor is greater than or equal to the first reference distance.

16. The method of claim 13, wherein the negative voltage includes a voltage of about −3 volts.

17. The method of claim 16, further comprising:
activating a call mode when the proximity sensor detects that the object approaches the proximity sensor such that the shortest distance between the proximity sensor and the object is equal to or less than the second reference distance.

18. The method of claim 17, wherein the object is a face of a user, and
the proximity sensor detects proximity with respect to the face of the user based on the capacitance variation.

19. The method of claim 17, further comprising:
driving the touch panel in a mutual capacitance sensing scheme.

20. The method of claim 17, further comprising:
driving the touch panel in a self-capacitance sensing scheme.

* * * * *